US007162693B2

(12) United States Patent
Yamanaka et al.

(10) Patent No.: US 7,162,693 B2
(45) Date of Patent: Jan. 9, 2007

(54) PROCESS FOR MANAGING DATA IN WHICH EXISTING DATA ITEM IS MOVED TO NEIGHBOR PAGE BEFORE INSERTION OR AFTER DELETION OF ANOTHER DATA ITEM

(75) Inventors: Minoru Yamanaka, Kawasaki (JP); Jo Ajisawa, Kanagawa (JP); Shuji Sekiya, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 614 days.

(21) Appl. No.: 09/821,298

(22) Filed: Mar. 29, 2001

(65) Prior Publication Data

US 2002/0040376 A1    Apr. 4, 2002

(30) Foreign Application Priority Data

Oct. 2, 2000    (JP)    ............................. 2000-301676

(51) Int. Cl.
*G06F 15/00*    (2006.01)
(52) U.S. Cl. ........................................ 715/514; 715/854
(58) Field of Classification Search ................ 715/514, 715/530, 500, 853, 854; 345/853, 854
See application file for complete search history.

(56) References Cited

U.S. PATENT DOCUMENTS

| 5,307,486 | A | * | 4/1994 | Nakamigawa | .................. 707/2 |
| 5,717,921 | A | * | 2/1998 | Lomet et al. | ............... 707/100 |
| 5,717,941 | A | * | 2/1998 | Yoshida et al. | ............. 715/525 |
| 5,758,356 | A | * | 5/1998 | Hara et al. | ................... 707/202 |
| 5,825,944 | A | * | 10/1998 | Wang | .......................... 382/309 |
| 5,852,822 | A | * | 12/1998 | Srinivasan et al. | ............ 707/4 |
| 5,893,086 | A | * | 4/1999 | Schmuck et al. | ............... 707/1 |
| 6,026,406 | A | * | 2/2000 | Huang et al. | ............... 707/100 |
| 6,266,660 | B1 | * | 7/2001 | Liu et al. | ........................ 707/3 |
| 6,311,187 | B1 | * | 10/2001 | Jeyaraman | .................... 707/10 |
| 6,314,424 | B1 | * | 11/2001 | Kaczmarski et al. | .......... 707/10 |
| 6,374,339 | B1 | * | 4/2002 | Iivonen | ....................... 711/170 |

(Continued)

FOREIGN PATENT DOCUMENTS

JP    3201045    9/1991

(Continued)

OTHER PUBLICATIONS

Culik, Dense Multiway Trees, ACM Sep. 1981, vol. 6, No. 3, pp. 486-512.*

(Continued)

*Primary Examiner*—Cong-Lac Huynh
(74) *Attorney, Agent, or Firm*—Greer, Burns & Crain, Ltd

(57) ABSTRACT

In a process for managing a plurality of data items contained in a plurality of pages which are sequentially arranged in accordance with predetermined relationships, information on an amount of available space in each of the plurality of pages is stored. When a first data item is inserted into or deleted from a first page among the plurality of pages, an amount of available space in each of second and third pages is acquired based on the above information, where the second page precedes the first page in the sequential arrangement of the plurality of pages, and the third page follows the first page in the sequential arrangement. Before insertion of the first data item into the first page or after deletion of the first data item from the first page, at least one second data item contained in the first page is moved to the second page or the third page according to the amount of available space in each of the second and third pages.

11 Claims, 12 Drawing Sheets

U.S. PATENT DOCUMENTS

| | | | |
|---|---|---|---|
| 6,377,259 B1 * | 4/2002 | Tenev et al. | 345/440 |
| 6,393,427 B1 * | 5/2002 | Vu et al. | 707/101 |
| 6,470,344 B1 * | 10/2002 | Kothuri et al. | 707/100 |
| 6,490,592 B1 * | 12/2002 | St. Denis et al. | 707/102 |
| 6,538,673 B1 * | 3/2003 | Maslov | 715/853 |
| 6,662,189 B1 * | 12/2003 | Oyanagi et al. | 707/102 |
| 6,760,306 B1 * | 7/2004 | Pan et al. | 370/230 |
| 6,772,165 B1 * | 8/2004 | O'Carroll | 707/101 |
| 6,859,455 B1 * | 2/2005 | Yazdani et al. | 370/392 |
| 2001/0045952 A1 * | 11/2001 | Tenev et al. | 345/440 |
| 2001/0051934 A1 * | 12/2001 | Oyanagi et al. | 706/12 |
| 2002/0023089 A1 * | 2/2002 | Woo | 707/101 |
| 2002/0083032 A1 * | 6/2002 | Bourges-Sevenier | 707/1 |
| 2002/0174201 A1 * | 11/2002 | Ramer et al. | 709/220 |
| 2003/0079157 A1 * | 4/2003 | Lee et al. | 714/20 |
| 2006/0143579 A1 * | 6/2006 | Torgerson | 715/854 |

FOREIGN PATENT DOCUMENTS

| | | |
|---|---|---|
| JP | 5-151035 | 6/1993 |
| JP | 7121411 | 5/1995 |
| JP | 11161525 | 6/1999 |

OTHER PUBLICATIONS

Choi et al., T*-tree : A Main Memory Database Index Structure for Real Time Application, IEEE 1996, pp. 81-88.*

Lomet et al., Concurrency and Recovery for Index Trees, the VLDB Journal 1997, p. 224-240.*

Jang et al., An Effective Mechanism for Index Update in Structured Document, ACM 1999, pp. 383-390.*

Chawathe et al., Meaningful Change Detection in Structured Data, ACM 1997, pp. 26-37.*

* cited by examiner

| PAGE NUMBER | INDICATION VALUE |
|---|---|
| 0001 | 11 |
| 0002 | 00 |
| 0003 | 10 |
| ⋮ | ⋮ |
| n | 01 |

FIG. 3(A)

| INDICATION VALUE | OCCUPATION RATE |
|---|---|
| 00 | 60%~100% |
| 01 | 40%~59% |
| 10 | 20%~39% |
| 11 | 0%~19% |

FIG. 3(B)

| PAGE NUMBER | INDICATION VALUE |
|---|---|
| 50 | 00 |
| 51 | 00 |
| 52 | 10 |

FIG. 5(A)

| PAGE NUMBER | INDICATION VALUE |
|---|---|
| 50 | 00 |
| 51 | 00 |
| 52 | 00 |

FIG. 5(B)

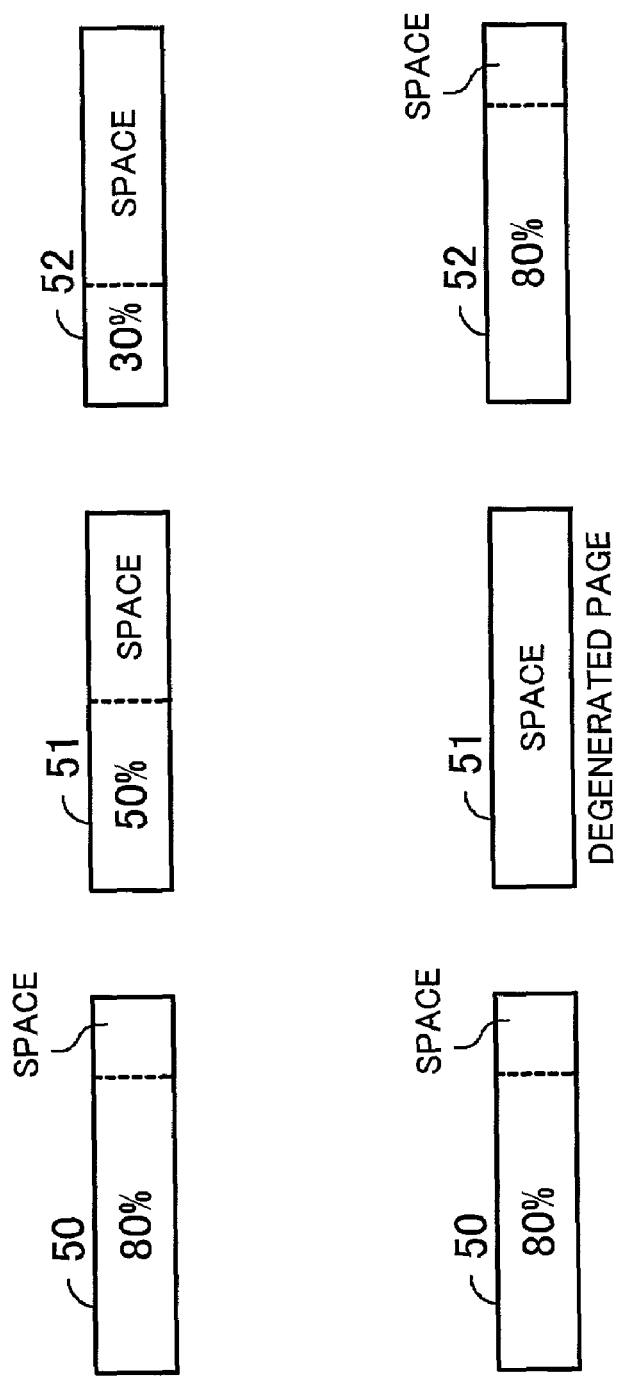

| PAGE NUMBER | INDICATION VALUE |
|---|---|
| 50 | 00 |
| 51 | 01 |
| 52 | 10 |

FIG. 7(A)

| PAGE NUMBER | INDICATION VALUE |
|---|---|
| 50 | 00 |
| 51 | – |
| 52 | 00 |

FIG. 7(B)

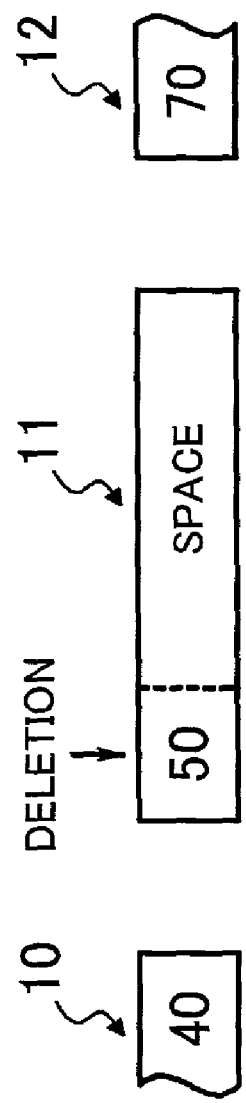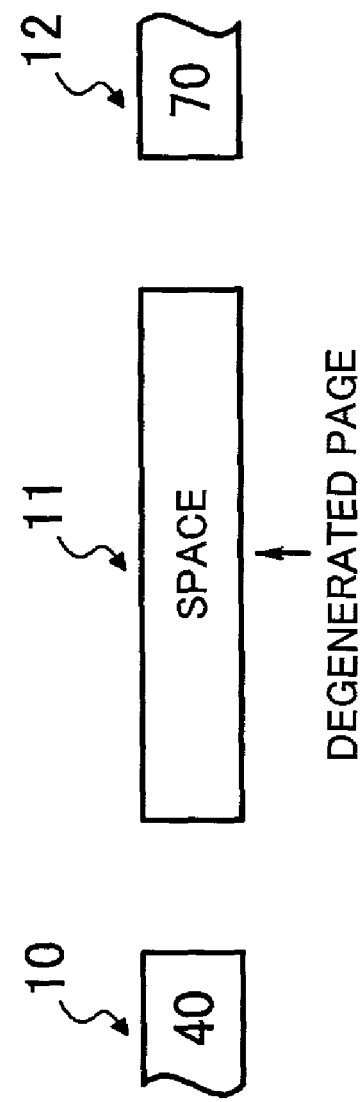
FIG. 12(A) PRIOR ART
FIG. 12(B) PRIOR ART

PROCESS FOR MANAGING DATA IN WHICH EXISTING DATA ITEM IS MOVED TO NEIGHBOR PAGE BEFORE INSERTION OR AFTER DELETION OF ANOTHER DATA ITEM

BACKGROUND OF THE INVENTION

1) Field of the Invention

The present invention relates to a process for managing a plurality of data items contained in a plurality of pages which are sequentially arranged in accordance with predetermined relationships. The present invention also relates to a data management apparatus which executes the above process.

2) Description of the Related Art

In data processing systems such as database systems, in which data are written or from which data are deleted, data fragmentation in secondary storage devices increases with the passage of time, and access performance is lowered.

An example of fragmentation which occurs in a B-Tree (balance tree) index (i.e., an index having a structure of a B-Tree) is explained below.

FIG. 10 is a diagram illustrating an example of a B-Tree index for a database. The fragmentation can occur in such an index. As illustrated in FIG. 10, a B-Tree index is comprised of a root page at the top level, index pages at an intermediate level or levels, and leaf pages at the bottom level. That is, the B-Tree index has a tree structure in which a plurality of branches extend from each node to a plurality of descendants of the node at lower levels, and a page is arranged at each node. Information indicating a range of values of keys is stored in each of the root page and the index pages so as to reach a leaf page based on the value of a key. In addition, at least one index data item each of which locates a record corresponding to a key are stored in each leaf page.

In the root page, the range from 0 to 50 is represented by "50", and the range from 51 to 100 is represented by "100". Therefore, when the value of a key is "10", the operation goes to the left index page. Since, in the left index page, the range from 0 to 30 is represented by "30", and the range from 31 to 50 is represented by "50", the operation then goes to the leftmost leaf page, which contains index data items "10" and "30". Thus, a record stored in a secondary storage device and located by the index data item "10" can be accessed.

When a new data item is added to a database which has a B-Tree index, or a data item is deleted from such a database, the B-Tree index per se must be modified accordingly. Examples of conventional methods of modification of a B-Tree index corresponding to addition of a data item to a database or deletion of a data item from a database are explained below.

FIGS. 11(A) through 11(C) are diagrams illustrating an example of a sequence of operations performed for modifying leaf pages in a B-Tree index for a database when a new data item is added to the database. When an index data item 20 having a value "60" is inserted into the leaf page 11 among the sequentially arranged leaf pages 10 to 12 as illustrated in FIG. 11(A), it is necessary to create a new leaf page 13 since there is no available space in the leaf page 11. Next, in order to obtain space for storing the new dynamic image data 20, two index data items respectively having values "80" and "90" in the leaf page 11 are moved to the newly created leaf page 13, as illustrated in FIG. 11(B). Then, the new index data item 20 is written in the obtained space in the leaf page 11, as illustrated in FIG. 11(C).

FIGS. 12(A) and 12(B) are diagrams illustrating an example of a sequence of operations performed for modifying leaf pages in a B-Tree index for a database when an existing data item is deleted from the database. When an index data item having a value "50" is deleted from the leaf page 11 among the sequentially arranged leaf pages 10 to 12 as illustrated in FIG. 12(A), no index data item remains in the leaf page 11 as illustrated in FIG. 12(B). Therefore, the leaf page 11 becomes a degenerated page, and is returned to the system.

As explained above, when a new index data item is inserted into a B-Tree index, often, fragmentation occurs in the leaf pages, i.e., short runs of space are generated in the leaf pages. Each leaf page having a short run of space remains to exist until the space is filled with a new index data item, or an index data item or index data items existing in the leaf page are deleted as illustrated in FIGS. 12(A) and 12(B), and the leaf page is returned as a degenerated page to the system. Further, fragmentation also occurs in the index pages.

Conventionally, when fragmentation occurs, the operation of the system is stopped, and the data items are rearranged by executing an defragmentation program. However, the frequency of occurrence of fragmentation varies with the circumstances. Therefore, a system management person is required to monitor occurrence of fragmentation.

In addition, many database systems and the like which are currently used are operated in a nonstop mode. Therefore, it is difficult to stop the operation of the system for performing defragmentation.

SUMMARY OF THE INVENTION

The object of the present invention is to provide a process for managing a plurality of data items contained in a plurality of pages which are sequentially arranged in accordance with predetermined relationships, whereby defragmentation is automatically performed without stopping the system, and a load imposed on a system management person is reduced.

(1) According to the first aspect of the present invention, there is provided a process for managing a plurality of data items contained in a plurality of pages which are sequentially arranged in accordance with predetermined relationships, comprising the steps of: (a) storing information on an amount of available space in each of the plurality of pages; (b) acquiring an amount of available space in each of first and second pages based on the information stored in step (a), when a first data item is inserted into or deleted from a third page, the plurality of pages include the first, second, and third pages, the first page precedes the third page in the sequential arrangement of the plurality of pages, and the second page follows the third page in the sequential arrangement; and (c) moving at least one second data item contained in the third page to the first page or the second page according to the amount of available space in each of the first and second pages, before insertion of the first data item into the third page or after deletion of the first data item from the third page.

The process according to the first aspect of the present invention may have one or any possible combination of the following additional features (i) to (iv).

(i) In the step (a), when the amount of the available space is equal to or less than a predetermined amount, the information may indicate that substantially no available space exists.

(ii) In the step (c), when both of the first and second pages have sufficient available space, the at least one second data item may be moved to the second page.

(iii) In the step (a), the amount of the available space may be classified into one of a plurality of ranges of amounts of the available space, and the information on the amount of the available space may indicate one of the plurality of ranges.

(iv) One of the plurality of ranges including the smallest amount of the available space may be wider than the other of the plurality of ranges.

(2) According to the second aspect of the present invention, there is provided a data management apparatus for managing a plurality of data items contained in a plurality of pages which are sequentially arranged in accordance with predetermined relationships, comprising: an available-space-information storing unit which stores information on an amount of available space in each of the plurality of pages; an adjacent-space-information acquiring unit which acquires an amount of available space in each of first and second pages based on the information stored in the available-space-information storing unit, when a first data item is inserted into or deleted from a third page, the plurality of pages include the first, second, and third pages, the first page precedes the third page in the sequential arrangement of the plurality of pages, and the second page follows the third page in the sequential arrangement; and a moving unit which moves at least one second data item contained in the third page to the first page or the second page according to the amount of available space in each of the first and second pages, before insertion of the first data item into the third page or after deletion of the first data item from the third page.

The data management apparatus according to the second aspect of the present invention may have one or any possible combination of the aforementioned additional features (i) to (iv).

(3) According to the first and second aspects of the present invention, at least one data item located around a deleted data item or a data item which is to be inserted can be rearranged at the time of the insertion or deletion. Therefore, fragmentation can be suppressed without stopping the system, and access performance can be improved. In addition, defragmentation can be efficiently performed, since the rearrangement is performed on only the at least one data item located around the deleted data item or the data item to be inserted according to the present invention, while the conventional defragmentation is performed on the entire storage area.

(4) According to the third aspect of the present invention, there is provided a computer-readable storage medium storing a program which makes a computer execute a process for managing a plurality of data items contained in a plurality of pages which are sequentially arranged in accordance with predetermined relationships, the program further makes the computer realize: an available-space-information storing unit which stores information on an amount of available space in each of the plurality of pages; an adjacent-space-information acquiring unit which acquires an amount of available space in each of first and second pages based on the information stored in the available-space-information storing unit, when a first data item is inserted into or deleted from a third page, the plurality of pages include the first, second, and third pages, the first page precedes the third page in the sequential arrangement of the plurality of pages, and the second page follows the third page in the sequential arrangement; and a moving unit which moves at least one second data item contained in the third page to the first page or the second page according to the amount of available space in each of the first and second pages, before insertion of the first data item into the third page or after deletion of the first data item from the third page.

The computer-readable storage medium according to the third aspect of the present invention may have one or any possible combination of the aforementioned additional features (i) to (iv).

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 3(A) is a diagram illustrating an example of an available-space management table;

FIG. 3(B) is a diagram illustrating examples of indications of page occupation ratios in the available space management table of FIG. 3(A);

FIG. 5(A) is a diagram illustrating an example of an available-space management table before the insertion of the index data item explained with reference to FIGS. 4(A) and 4(B);

FIG. 5(B) is a diagram illustrating an example of the available-space management table after the insertion of the index data item explained with reference to FIGS. 4(A) and 4(B);

FIG. 6(A) is a diagram illustrating examples of sequentially arranged leaf pages before deletion of an index data item from a leaf page;

FIG. 6(B) is a diagram illustrating examples of sequentially arranged leaf pages after the deletion of the index data item from the leaf page;

FIG. 7(A) is a diagram illustrating an example of an available-space management table before the deletion of the index data item explained with reference to FIGS. 6(A) and 6(B);

FIG. 7(B) is a diagram illustrating an example of the available-space management table after the deletion of the index data item explained with reference to FIGS. 6(A) and 6(B);

FIGS. 12(A) and 12(B) are diagrams illustrating an example of a sequence of operations performed for modifying leaf pages in a B-Tree index for a database when an existing data item is deleted from the database.

DESCRIPTION OF THE PREFERRED EMBODIMENTS

Embodiments of the present invention are explained in detail below with reference to drawings.

(1) Functions of Data Management Apparatuses

Figure 1:
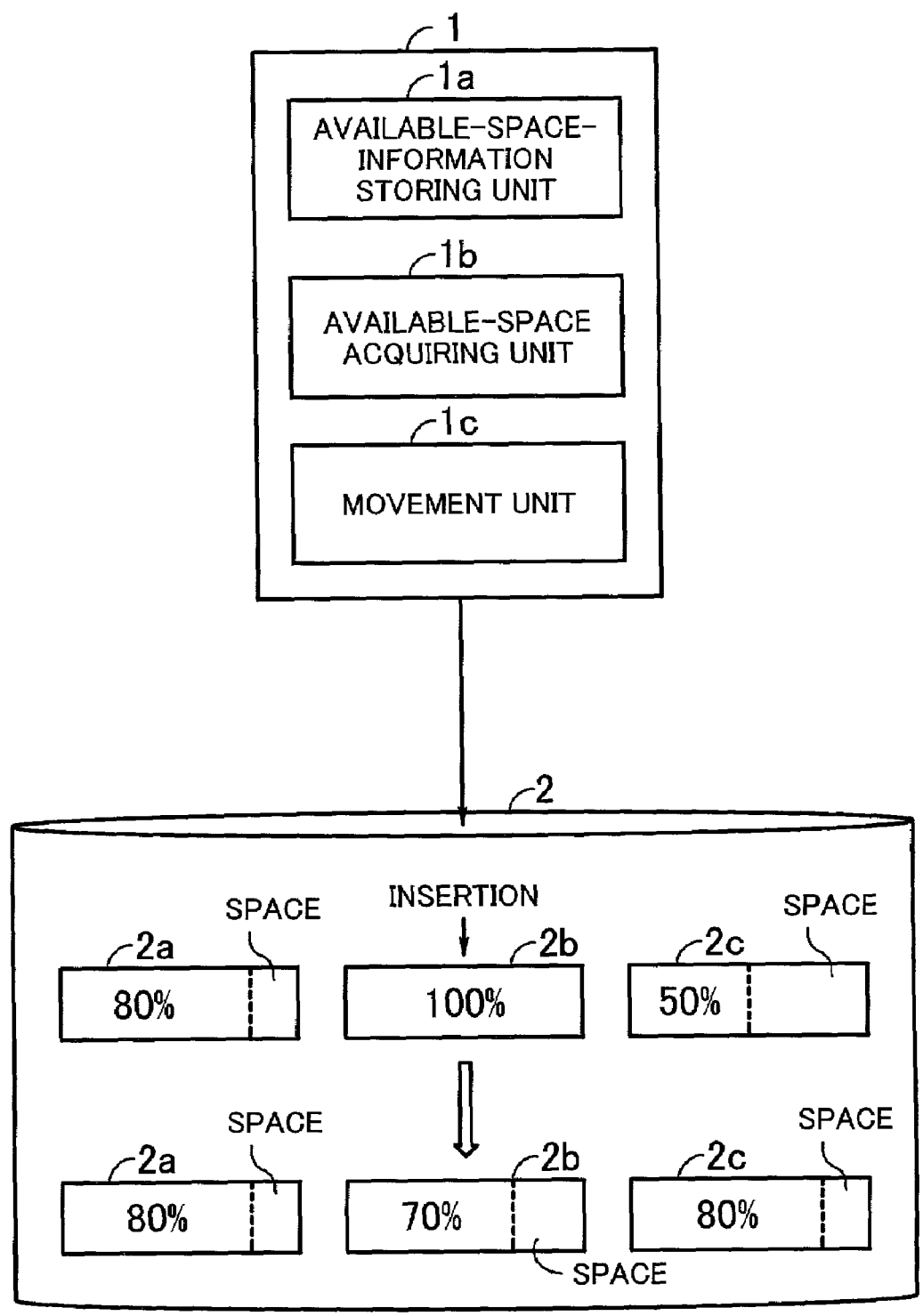
FIG. 1 is a diagram illustrating the principle of the present invention.

FIG. 1 is a diagram illustrating the principle of the present invention. In FIG. 1, reference numeral 1 denotes a data management apparatus according to the present invention, and 2 denotes a database which stores a plurality of data items in a plurality of pages (including the pages 2a to 2c illustrated in FIG. 1) sequentially arranged in accordance with predetermined relationships. The data management apparatus 1 comprises an available-space-information storing unit 1a, an available-space acquiring unit 1b, and a movement unit 1c, and manages the data stored in the database 2.

The available-space-information storing unit 1a stores information on an amount of available space in each page, where each page is a storage area in which a predetermined amount of data can be stored. When a first data item is inserted into or deleted from a first page among the plurality of pages, the available-space acquiring unit 1b acquires an amount of available space in each of second and third pages among the plurality of pages by referring to the available-space-information storing unit 1a, where the second page precedes the first page in the sequential arrangement of the plurality of pages, and the third page follows the second page in the sequential arrangement. The movement unit 1c moves at least one second data item contained in the first page to the second page or the third page according to the amount of available space in each of the second and third pages, before insertion of the first data item into the first page or after deletion of the first data item from the first page.

The operations of the data management apparatus 1 according to the present invention which are performed when a new (first) data item is inserted into the page 2b are explained below.

First, the available-space acquiring unit 1b refers to the available-space-information storing unit 1a, and acquires the amount of available space in the page 2b into which the first data item is to be inserted. In the example of FIG. 1, the page occupation ratio of the page 2b is 100% (as indicated in the upper row of the pages 2a to 2c in FIG. 1), i.e., there is no available space in the page 2b. When the available-space acquiring unit 1b recognizes that there is no available space in the page 2b, the available-space acquiring unit 1b refers to the available-space-information storing unit 1a, and acquires the amount of available space in each of the page 2a which precedes the page 2b and the page 2c which follows the page 2b. As indicated in the upper row of the pages 2a to 2c in FIG. 1, the page occupation ratio of the page 2a is 80%, i.e., the amount of available space in the page 2a is 20%, and the page occupation ratio of the page 2c is 50%, i.e., the amount of available space in the page 2c is 50%.

Next, the movement unit 1c determines to which of the pages 2a and 2c a portion or all (at least one second data item) of the data existing in the page 2b is to be moved, based on the data amount of the first data item to be inserted into the page 2b and the amount of available space in each of the pages 2a and 2c acquired by the available-space acquiring unit 1b. In this example, when the data amount of the first data item corresponds to 30% of the capacity of the page 2b, the movement unit 1c determines that a portion of the data existing in the page 2b is to be moved to the page 2c, and moves the portion to the page 2c, where the amount of the moved portion corresponds to 30% of the capacity of the page 2b. Accordingly, available space corresponding to 30% of the capacity of the page 2b is obtained in the page 2b, and thus the first data item can be inserted into the page 2b.

As explained above, according to the present invention, when there is no available space in a target page (i.e., a page into which a new data item is to be inserted), a necessary amount of data in the target page is moved to a neighbor page. Therefore, the new data item can be inserted into the target page without creating a new page. Thus, increase in fragmentation can be prevented.

(2) Hardware Construction

Figure 2:
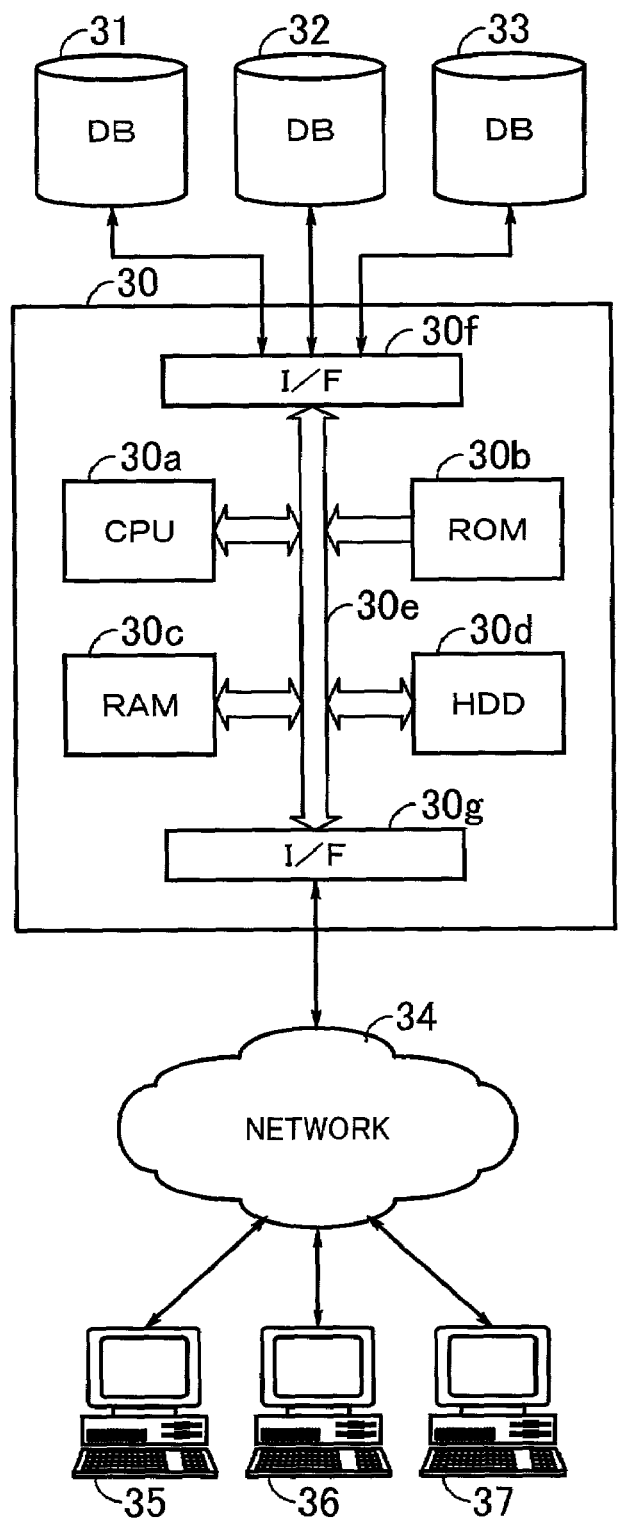
FIG. 2 is a diagram illustrating an example of a hardware construction of the data management apparatus according to the present invention.

FIG. 2 is a diagram illustrating an example of a hardware construction of the data management apparatus as an embodiment of the present invention. In FIG. 2, reference numeral 30 denotes a server as the data management apparatus, 31, 32, and 33 each denote a database (DB), 34 denotes a network, and 35, 36, and 37 each denote a client.

The server 30 comprises a central processing unit (CPU) 30a, a read only memory (ROM) 30b, a random access memory (RAM) 30c, a hard disk drive (HDD) 30d, a bus 30e, and interfaces (I/F) 30f and 30g. The server 30 manages the databases 31 to 33. In response to a request from one of the clients 35 to 37, the server 30 writes data in the databases 31 to 33, and reads data from the databases 31 to 33.

The CPU 30a controls the respective portions of the server 30, and executes various kinds of processing in accordance with programs and data stored in HDD 30d and the like. The ROM 30b stores basic programs to be executed by the CPU 30a and data used in the execution of programs. The RAM 30c temporarily stores a currently executed program and data relating to the execution. The HDD 30d stores data and programs to be executed by the CPU 30a. The bus 30e interconnects the CPU 30a, the ROM 30b, the RAM 30c, the HDD 30d, and the interfaces 30f and 30g so as to enable data transfer between the CPU 30a, the ROM 30b, the RAM 30c, the HDD 30d, and the interfaces 30f and 30g. The interface 30f electrically connects the server 30 with the databases 31 to 33 so that data can be transferred between the server 30 and the databases 31 to 33. When data are exchanged between the server 30 and the network 34, the interface 30g transforms data forms, and converts protocols. The network 34 is, for example, the Internet, and data is transmitted through the network 34 between the server 30 and the clients 35 to 37. The clients 35 to 37 are realized by, for example, personal computers, and access the server 30 in order to write data in and read data from the databases 31 to 33.

The databases 31 to 33 are constituted by Hard Disk Drives or the like, and store data and B-Tree indexes for use in management of the data.

(3) Page Occupation Rate

A page number is assigned to each of pages (such as the index pages and leaf pages) constituting the B-Tree index for each of the databases 31 to 33. Directories of the databases 31 to 33 contain available-space management tables, each of which indicates an occupation rate of each page of the B-Tree index. For example, in each available-space management table, the page is indicated by the page number, and the occupation rate is indicated by two-bit data, as illustrated in FIG. 3(A). The two-bit data indicates a range of the occupation rates as illustrated in FIG. 3(B), where the occupation rate is expressed as percent. That is, in this example, the occupation rate in the range of 0 to 19% is represented by the two-bit data "11", the occupation rate in the range of 20 to 39% is represented by the two-bit data "10", the occupation rate in the range of 40 to 59% is represented by the two-bit data "01", and the occupation rate in the range of 60 to 100% is represented by the two-bit data "00". In order to prevent frequent occurrence of the movement of the index data item, consolidation of two leaf pages, and the like, the range including the highest occupation rates 60 to 100% is wider than the other ranges.

(4) Insertion of Index Data Item into Leaf Page

An operation of inserting an index data item into a leaf page (hereinbelow called a page) in a B-Tree index is explained below with reference to FIGS. 4(A), 4(B), 5(A), and 5(B).

Figure 4A:
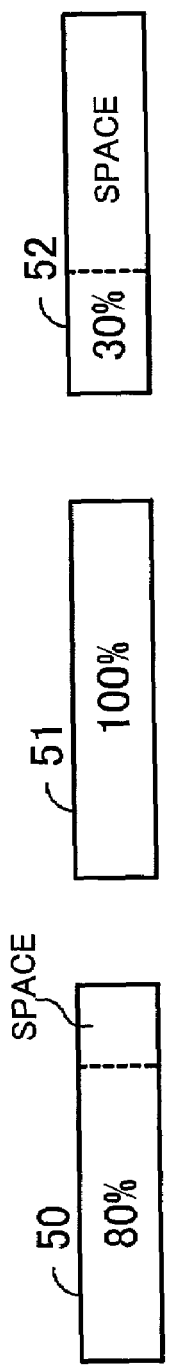
FIG. 4(A) is a diagram illustrating examples of sequentially arranged leaf pages before insertion of an index data item into a leaf page.
Figure 4B:
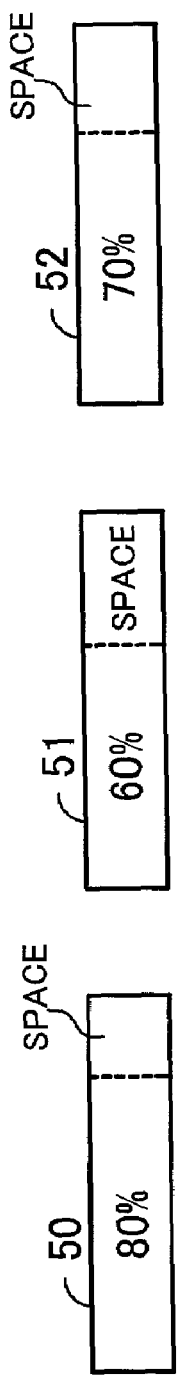
FIG. 4(B) is a diagram illustrating examples of sequentially arranged leaf pages after the insertion of the index data item into the leaf page.

When an instruction to add a new data item to the database 31 is sent from one of the clients 35 to 37 to the server 30, the CPU 30a in the server 30 receives the instruction, and determines a target page, i.e., a page into which a new index data item corresponding to the new data item is to be inserted, by referring to the B-Tree index of the database 31. For example, when the page 51 illustrated in FIG. 4(A) is determined to be the target page, the CPU 30a refers to the available-space management table (as explained with reference to FIG. 3(A)), and acquires information on the occupation rate of the page 51. FIG. 5(A) is a diagram illustrating an example of the available-space management table before the insertion of the index data item. Since, in this example, there is no available space in the page 51 as illustrated in FIG. 4(A), the available-space management table indicates "00" for the page 51. When the CPU 30a recognizes that there is no available space in the page 51, the CPU 30a acquires information on the occupation rates of the pages 50 and 52 by referring to the available-space management table, where the page 50 precedes the page 51, and the page 52 follows the page 51. Since, in this example, the available space in the page 52 amounts to 70% of the full capacity as illustrated in FIG. 4(A), the available-space management table indicates "10" for the page 52 as illustrated in FIG. 5(A). Therefore, the CPU 30a moves a portion of data in the page 51 to the page 52 so as to obtain necessary space in the page 51. That is, the CPU 30a calculates a data amount required to be moved for insertion of the new index data item into the page 51, and moves to the page 52 a portion or all of data (at least one index data item) in the page 51 corresponding to the calculated data amount. For example, when the amount of the new index data item to be inserted into the page 51 is calculated to be 40%, a portion of data (at least one index data item) in the page 51 corresponding to 40% of the full capacity of the page 51 is moved to the page 52. As a result, available space corresponding to 40% of the full capacity is obtained in the page 51 as illustrated in FIG. 4(B). Then, the CPU 30a inserts the new index data item into the page 51, and rewrites the indications (two-bit data) of the occupation rates of the pages 51 and 52 in the available-space management table as illustrated in FIG. 5(B). Thereafter, the contents of the index pages in the B-Tree index are updated corresponding to the changes in the contents of the leaf pages.

As explained above, according to the present invention, when a new index data item is requested to be inserted into a target page, the amount of available space in the target page is detected. Then, when there is not sufficient available space in the target page, it is determined whether or not sufficient available space exists in either of the preceding and following pages. When sufficient available space exits in one of the preceding and following pages, a portion or all of the data existing in the target page are moved to the one of the preceding and following pages, and then the new index data item is inserted into the target page. Therefore, when sufficient available space exits in at least one of the preceding and following pages, it is not necessary to create a new page, and fragmentation can be reduced to a minimum.

In addition, since defragmentation is automatically performed when a new index data item is inserted into a page, it is not necessary to stop the operation of the system for defragmentation. Therefore, the system management person can be relieved from the work of monitoring the condition of the system.

(5) Deletion of Index Data Item from Leaf Page

An operation of deleting an index data item from a leaf page (hereinbelow called a page) in a B-Tree index is explained below with reference to FIGS. 6(A), 6(B), 7(A), and 7(B).

When an instruction to delete a data item from the database 31 is sent from one of the clients 35 to 37 to the server 30, the CPU 30a in the server 30 receives the instruction, and determines a target page, i.e., a page from which an index data item corresponding to the data item to be deleted from the database 31 is to be deleted, by referring to the B-Tree index of the database 31. For example, when the page 51 illustrated in FIG. 6(A) is determined to be the target page, the CPU 30a deletes the index data item from the target page, and updates the indication of the occupation rate of the page 51 in the available-space management table. Since, in this example, available space corresponding to 50% of the full capacity remains in the page 51 as illustrated in FIG. 6(A), the indication of the occupation rate of the page 51 is updated to "01", as illustrated in FIG. 7(A). Next, the CPU 30a acquires information on the occupation rates of the pages 50 preceding the page 51 and the page 52 following the page 51, by referring to the available-space management table, and determines whether or not all of the data (at least one index data item) remaining in the target page 51 can be moved to the preceding page 50 or the following page 52. Since, in this example, available space in the page 52 is 70% of the full capacity, the CPU 30a determines that all of the data remaining in the target page 51 can be moved to the page 52, and the movement is made. Accordingly, no data (index data item) remains in the page 51 as illustrated in FIG. 6(B). Therefore, the CPU 30a returns to the system the page 51 as a degenerated page, and updates the available-space management table as illustrated in FIG. 7(B). Thereafter, the contents of the index pages in the B-Tree index are updated corresponding to the changes in the contents of the leaf pages.

As explained above, according to the present invention, when an index data item is requested to be deleted from a target page, the amount of remaining data in the target page after the deletion and the amount of available space in each of the preceding and following pages are detected. When it is determined that all of the data remaining in the target page can be moved to the preceding page or the following page, the movement is made, and the vacated page is returned to the system. Therefore, fragmentation can be reduced to a minimum.

In addition, since defragmentation is automatically performed when an index data item is deleted from a page, it is not necessary to stop the operation of the system for defragmentation. Therefore, the system management person can be relieved from the work of monitoring the condition of the system.

(6) Sequence of Insertion of Index Data Item into Leaf Page

Figure 8:
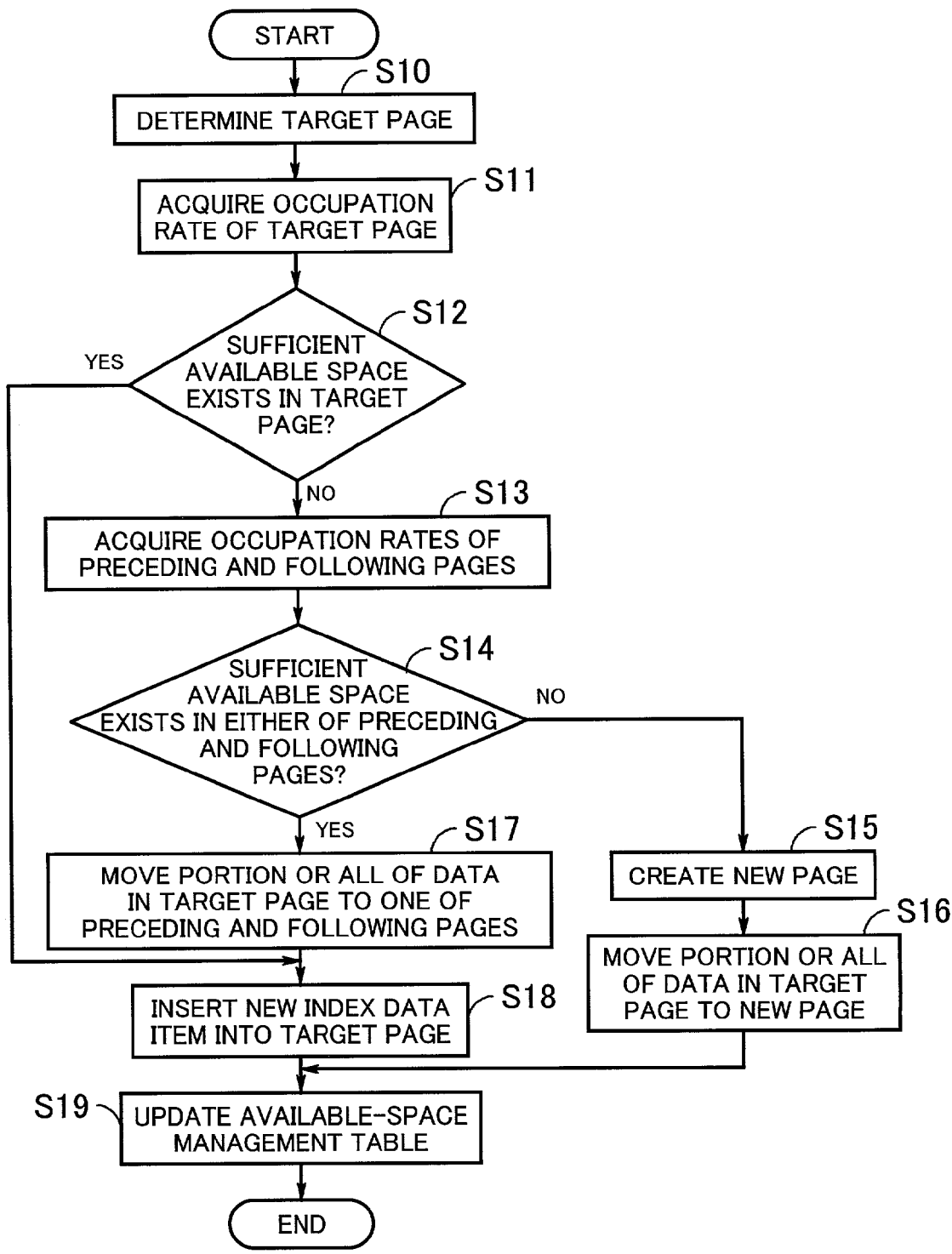
FIG. 8 is a flow diagram illustrating a sequence of operations for inserting an index data item into a (leaf) page of an index for a database when a new data item is added to the database.

FIG. 8 is a flow diagram illustrating a sequence of operations for inserting an index data item into a (leaf) page of an index for a database when a new data item is added to the database.

In step S10, the CPU 30a determines a target page (leaf page) into which a new index data item corresponding to the data item to be added to the database is to be inserted, by referring to the B-Tree index for the database. In step S11, the CPU 30a acquires information on the occupation rate of the target page, by referring to the available-space management table. In step S12, the CPU 30a determines, based on the acquired information on the occupation rate of the target page, whether or not the target page includes available space which is sufficient for the insertion of the new index data item. When yes is determined in step S12, the operation goes to step S18. When no is determined in step S12, the operation goes to step S13. In step S13, the CPU 30a acquires information on occupation rates of a preceding page and a following page from the available-space management table, where, in the sequential arrangement of the plurality of leaf pages of the index, the preceding page precedes the target page, and the following page follows the target page. In step S14, the CPU 30a determines, based on the acquired information on the occupation rates of the preceding page and the following page, whether or not one of the preceding page and the following page includes available space which is sufficient for receiving a portion or all (at least one index data item) of the data currently stored in the target page, where the amount of the portion or all of the data is determined so that the new index data item can be inserted into the target page after the portion or all of the data are moved from the target page to one of the preceding page and the following page. When yes is determined in step S14, the operation goes to step S17. When no is determined in step S14, the operation goes to step S15. In step S15, the CPU 30a creates a new page (leaf page), and inserts the new page immediately after the target page. In step S16, the CPU 30a moves to the new page a portion or all of the data currently stored in the target page, where the amount of the portion or all of the data is determined so that the new index data item can be inserted into the target page after the portion or all of the data are moved from the target page to the new page. Then, the CPU 30a inserts the new index data item into the target page. In step S17, the CPU 30a moves a portion or all of the data currently stored in the target page to one of the preceding page and the following page, where the amount of the portion or all of the data is determined so that the new index data item can be inserted into the target page after the portion or all of the data are moved from the target page to the one of the preceding page and the following page. When both of preceding page and the following page have sufficient available space, the above portion or all of the data in the target page are moved to the following page in consideration of cost. In step S18, the CPU 30a inserts the new index data item into the target page.

In step S19, the CPU 30a updates the available-space management table corresponding to the above changes in the (leaf) pages.

(7) Sequence of Deletion of Index Data Item from Leaf Page

Figure 9:
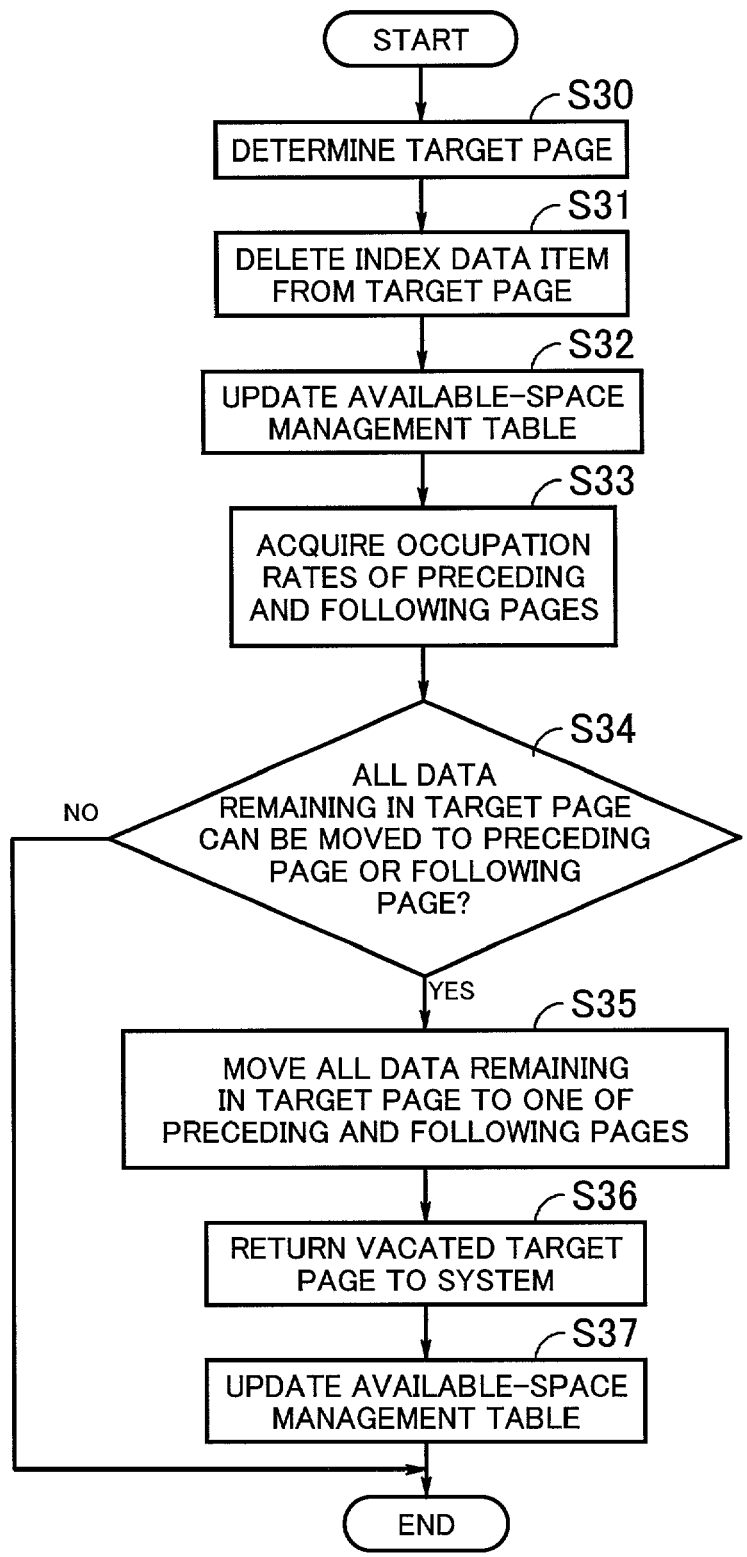
FIG. 9 is a flow diagram illustrating a sequence of operations for deleting an index data item from a (leaf) page of an index for a database when a data item is deleted from the database.
Figure 10:
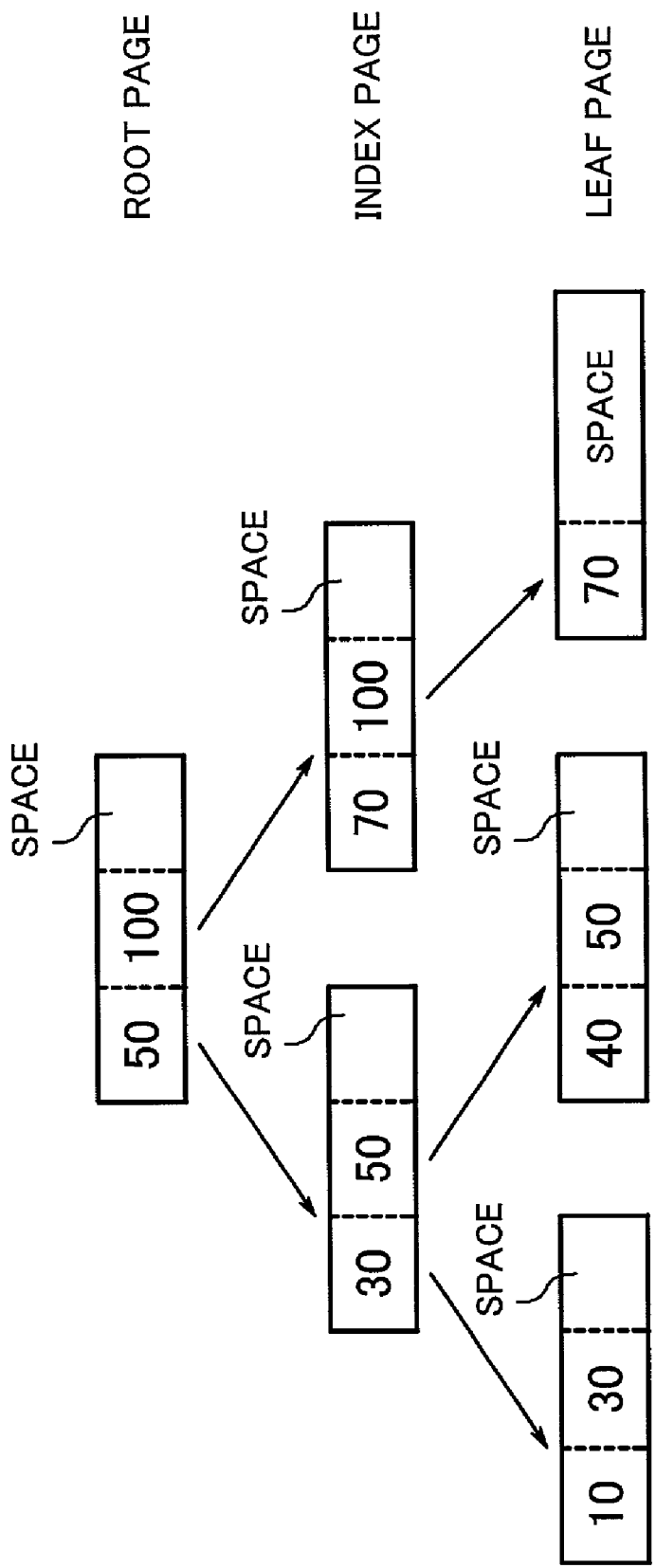
FIG. 10 is a diagram illustrating an example of a BTree index for a database.
Figure 11A:
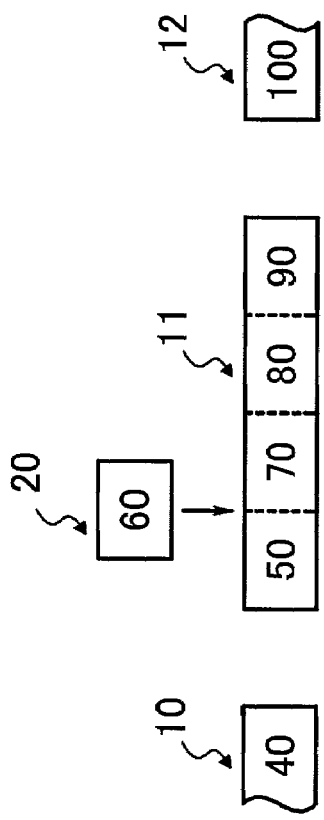
FIGS. 11(A) to 11(C) are diagrams illustrating an example of a sequence of operations performed for modifying leaf pages in a B-Tree index for a database when a new data item is added to the database.
Figure 11B:
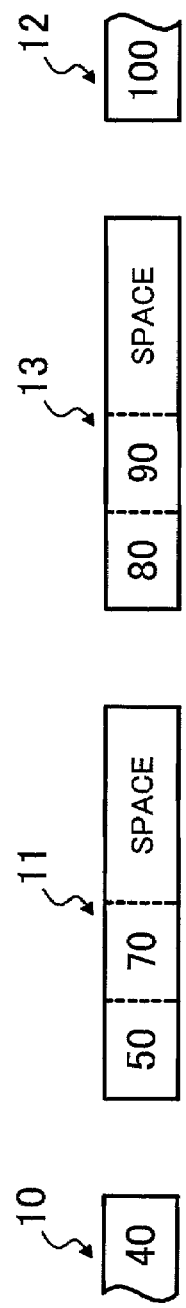
Figure 11C:
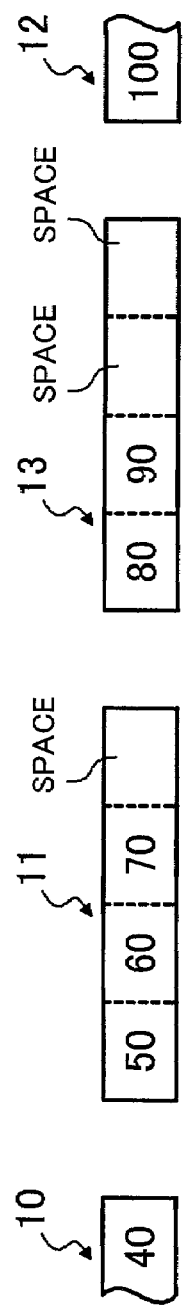

FIG. 9 is a flow diagram illustrating a sequence of operations for deleting an index data item from a (leaf) page of an index for a database when a data item is deleted from the database.

In step S30, the CPU 30a determines a target page from which an index data item corresponding to the data item to be deleted from the database 31 is to be deleted, by referring to the B-Tree index for the database. In step S31, the CPU 30a deletes the index data item from the target page. In step S32, the CPU 30a updates the contents of the available-space management table corresponding to the deletion of the index data item from the target page. In step S33, the CPU 30a acquires information on occupation rates of a preceding page and a following page from the available-space management table, where, in the sequential arrangement of the plurality of leaf pages of the index, the preceding page precedes the target page, and the following page follows the target page. In step S34, the CPU 30a determines whether or not all of the data (at least one index data item) remaining in the target page can be moved to the preceding page or the following page. When yes is determined in step S34, the operation goes to step S35. When no is determined in step S34, the operation of FIG. 9 is completed. In step S35, the CPU 30a moves all of the data remaining in the target page to one of the preceding page and the following page which is determined in step S34. When it is determined that all of the data remaining in the target page can be moved to each of the preceding page and the following page, the data are moved to the following page in consideration of cost. In step S36, the CPU 30a returns the vacated target page to the system, as a degenerated page which can be reused. In step S37, the CPU 30a updates the available-space management table corresponding to the above changes in the (leaf) pages.

According to the sequences of FIGS. 8 and 9, fragmentation can be reduced during the operations of insertion or deletion of data.

(8) Advantages of Embodiment

According to the present invention, when a new data item is added to a database, at least one index data item in a target page of an index is moved to one of a preceding page or a following page, as necessary, before a new index data item corresponding to the new data item is inserted into the target page. In addition, when a data item is deleted from a database, all of at least one index data item remaining in a target page of an index after deletion of an index data item corresponding to the deleted data item from the target page is moved to one of a preceding page or a following page, where possible. Therefore, fragmentation in the storage area of the index can be reduced to a minimum. As a result, it is possible to minimize the storage area necessary to store the index since the number of pages of the index is minimized. In addition, the access performance in a sequential search of pages in the lateral direction can be improved when the sequential search is performed based on a predetermined range of values of a key.

(9) Recording Medium Storing Program (i) In the above embodiment, the present invention is applied to processing for insertion and deletion of an index data item into a page in a B-Tree index. However, the present invention can be applied to processing for insertion and deletion of data in any system which handles a plurality of data items contained in a plurality of pages which are sequentially arranged in accordance with predetermined relationships.

(ii) The functions of the data management apparatus according to the present invention can be realized by a computer. The functions of the data management apparatus can be written as a program, which can be stored in a computer-readable storage medium. The functions can be realized by a computer by executing the program. The computer-readable storage medium may be a magnetic storage device, a semiconductor memory, or the like. In order to put the program into the market, the program may be stored in a portable storage medium such as a CD-ROM (compact-disk read-only memory) and a floppy disc. Alternatively, the programs can be stored in a storage device belonging to a first computer, and transferred to a second computer connected through a network to the first computer. When the program is executed by a computer, the program can be stored in a hard disk drive or the like belonging to the computer, and loaded into a main memory of the computer.

(iii) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(iv) In addition, all of the contents of the Japanese patent application, No.2000-301676 are incorporated into this specification by reference.

What is claimed is:

1. A process for managing a plurality of data items contained in a plurality of pages which are sequentially arranged in accordance with predetermined relationships, comprising the steps of:
   (a) storing, in an available-space-information storing unit, information on an amount of available space in each of said plurality of pages;
   (b) acquiring an amount of available space in each of first and second pages based on said information stored in step (a), when a first data item is inserted into or deleted from a third page, said plurality of pages include the first, second, and third pages, the first page precedes the third page in sequential arrangement of the plurality of pages, and the second page follows the third page in the sequential arrangement; and
   (c) moving at least one second data item contained in said third page to said first page or said second page according to said amount of available space in each of said first and second pages, before insertion of said first data item into said third page or after deletion of said first data item from said third page;
   wherein, in said step (a), said amount of the available space is classified into one of a plurality of ranges of amounts of the available space, and said information on the amount of the available space indicates one of the plurality of ranges.

2. A process according to claim 1, wherein, in said step (a), when said amount of said available space is equal to or less than a predetermined amount, said information indicates that substantially no available space exists.

3. A process according to claim 1, wherein one of said plurality of ranges indicating the smallest amount of available space is a wider range than any of the other of said plurality of ranges.

4. A computer-readable storage medium storing a program which makes a computer execute a process for managing a plurality of data items contained in a plurality of pages which are sequentially arranged in accordance with predetermined relationships, said program further makes said computer realize:
   an available-space-information storing unit which stores information on an amount of available space in each of said plurality of pages;
   an adjacent-space-information acquiring unit which acquires an amount of available space in each of first and second pages based on said information stored based on said information stored in said available-space-information storing unit, when a first data item is inserted into or deleted from a third page, said plurality of pages include the first, second, and third pages, the first page precedes the third page in sequential arrangement of the plurality of pages, and the second page follows the third page in the sequential arrangement; and
   a moving unit which moves at least one second data item contained in said third page to said first page or said second page according to said amount of available space in each of said first and second pages, before-insertion of said first data item into said third page or after deletion of said first data item from said third page,
   wherein said amount of the available space is classified into one of a plurality of ranges of amounts of the available space, and said information on the amount of the available space indicates one of the plurality of ranges.

5. A computer-readable storage medium according to claim 4, wherein one of said plurality of ranges indicating the smallest amount of available space is a wider range than any of the other of said plurality of ranges.

6. A data management apparatus for managing a plurality of data items contained in a plurality of pages which are sequentially arranged in accordance with predetermined relationships, comprising:
   an available-space-information storing unit which stores information on an amount of available space in each of said plurality of pages;
   an adjacent-space-information acquiring unit which acquires an amount of available space in each of first and second pages based on said information stored based on said information stored in said available-space-information storing unit, when a first data item is inserted into or deleted from a third page, said plurality of pages include the first, second, and third pages, the first page precedes the third page in sequential arrangement of the plurality of pages, and the second page follows the third page in the sequential arrangement;
   a moving unit which moves at least one second data item contained in said third page to said first page or said second page according to said amount of available space in each of said first and second pages, before insertion of said first data item into said third page or after deletion of said first data item from said third page;
   wherein said amount of the available space is classified into one of a plurality of ranges of amounts of the available space, and said information on the amount of the available space indicates one of the plurality of ranges.

7. A data management apparatus according to claim 6, wherein one of said plurality of ranges indicating the smallest amount of available space is a wider range than any of the other of said plurality of ranges.

8. A process for managing a plurality of data items contained in a plurality of pages which are sequentially arranged in accordance with predetermined relationships, comprising the steps of:
(a) storing information on an amount of available space in each of said plurality of pages;
(b) acquiring an amount of available space in each of first and second pages based on said information stored in step (a), when a first data item is inserted into or deleted from a third page, said plurality of pages include the first, second, and third pages, the first page precedes the third page in sequential arrangement of the plurality of pages, and the second page follows the third page in the sequential arrangement; and
(c) moving at least one second data item contained in said third page to said first page or said second page according to said amount of available space in each of said first and second pages, before insertion of said first data item into said third page or after deletion of said first data item from said third page;
wherein, in said step (a), said amount of the available space is classified into one of a plurality of ranges of amounts of the available space, and said information on the amount of the available space indicates one of the plurality of ranges; and
wherein, in said step (c), when both of said first and second pages have sufficient available space, said at least one second data item is moved to said second page and when said first page has sufficient available space and said second page has insufficient available space, said at least one second data item is moved to said first page.

9. A process according to claim 8, wherein one of said plurality of ranges indicating the smallest amount of available space is a wider range than any of the other of said plurality of ranges.

10. A process for managing a plurality of data items contained in a plurality of pages which are sequentially arranged in accordance with predetermined relationships, comprising the steps of:

(a) storing information on an amount of available space in each of said plurality of pages;

(b) acquiring an amount of available space in each of first and second pages based on said information stored in step (a), when a first data item is inserted into or deleted from a third page, said plurality of pages include the first, second, and third pages, the first page precedes the third page in sequential arrangement of the plurality of pages, and the second page follows the third page in the sequential arrangement; and (c) moving at least one second data item contained in said third page to said first page or said second page according to said amount of available space in each of said first and second pages, before insertion of said first data item into said third page or after deletion of said first data item from said third page, wherein, in said step (a), said amount of the available space is classified into one of a plurality of ranges of amounts of the available space, and said information on the amount of the available space indicates one of the plurality of ranges.

11. A process according to claim 10, wherein one of said plurality of ranges indicating the smallest amount of available space is a wider range than any of the other of said plurality of ranges.

* * * * *